United States Patent [19]
Gilbert et al.

[11] Patent Number: 4,704,849
[45] Date of Patent: Nov. 10, 1987

[54] WHEEL-MOUNTED WEED TRIMMER

[76] Inventors: Zachary R. Gilbert, 400 N. 72 Way, Hollywood, Fla. 33024; Richard A. Gorz, 2115 Nova Village Dr., Davie, Fla. 33317

[21] Appl. No.: 809,751

[22] Filed: Dec. 17, 1985

[51] Int. Cl.$^4$ .............................................. A01D 34/67
[52] U.S. Cl. ...................................... 56/17.5; 56/16.7
[58] Field of Search ....................... 56/16.9, 11.9, 17.1, 56/16.7, 17.5, 17.2, DIG. 18

[56] References Cited

U.S. PATENT DOCUMENTS

| | | | |
|---|---|---|---|
| 2,564,201 | 8/1951 | Hawke | 56/17.2 |
| 2,673,366 | 3/1954 | Johnson | 56/16.7 |
| 2,790,292 | 4/1957 | Trecker | 56/16.9 |
| 3,774,379 | 11/1973 | Mirobath et al. | 56/17.5 |
| 3,788,049 | 1/1974 | Ehrlich | 56/11.9 |
| 4,043,101 | 8/1977 | Lahn et al. | 56/17.5 |
| 4,127,938 | 12/1978 | Slingerland, Jr. | 56/17.1 |
| 4,224,784 | 9/1980 | Hansen et al. | 56/16.9 |
| 4,463,493 | 8/1984 | Everts | 56/17.1 |
| 4,531,350 | 7/1985 | Hothmacher | 56/17.5 |

*Primary Examiner*—Paul J. Hirsch
*Attorney, Agent, or Firm*—Berman, Aisenberg & Platt

[57] ABSTRACT

A carriage finding particular utility for support of a lawn trimmer is comprised of two frame members connected by a yoke. The yoke is made of two pieces which may pivot with respect to each other to allow insertion or removal of the handle of the trimmer. When it is desired to store the apparatus, the yoke may be broken into two pieces to reduce the area required for storage. The yoke is pivotally mounted to the frame members to permit angular adjustment about a horizontal axis, and various mounting holes are provided in the frame members to permit further adjustment of the yoke.

6 Claims, 7 Drawing Figures

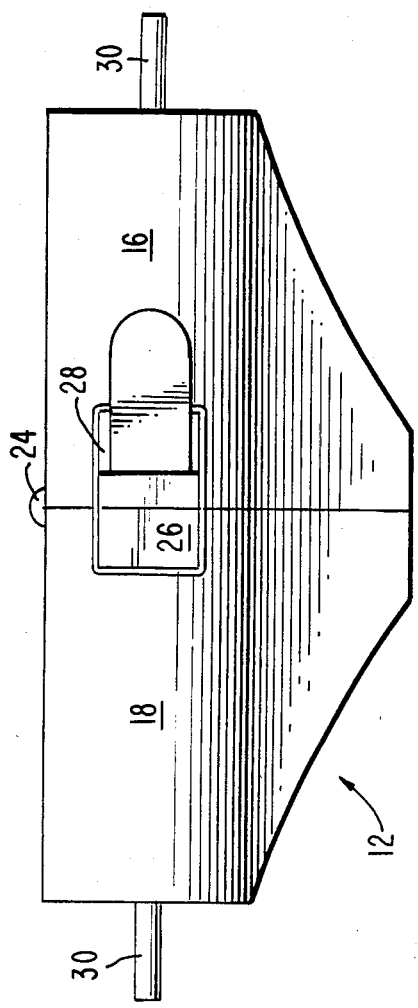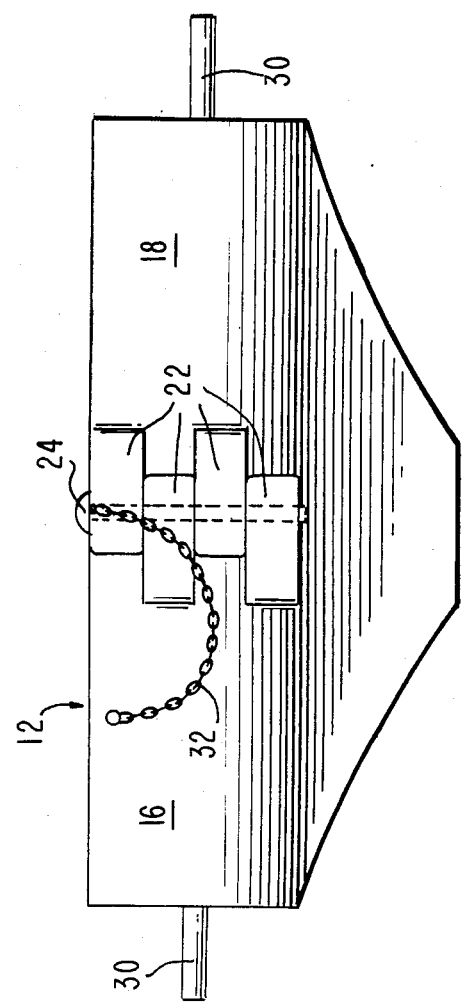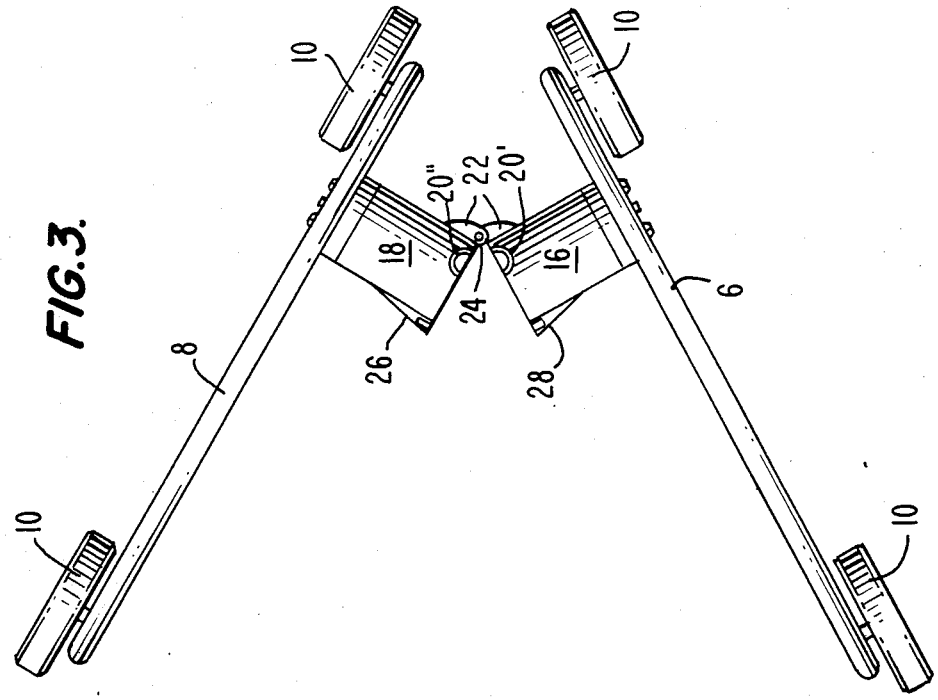

WHEEL-MOUNTED WEED TRIMMER

TECHNICAL FIELD

This invention relates to the art of wheeled supports for equipment. In particular, the invention finds utility in supporting a known lawn trimming apparatus.

BACKGROUND ART

In a known lawn-trimming apparatus, a motor is used to rotate a shaft having a flexible filament for trimming grass, or the like. This device includes an elongate handle attached to a housing which carries the rotatable shaft. The operator typically holds a handle with both hands such that the rapidly-rotating filament is close to the ground and is easily guided to the desired location.

When tending a smaller yard, it is often not necessary to utilize a conventional lawn mower, it being easier to simply move a trimmer, such as the filament trimmer, over the entire yard. This is, however, somewhat difficult because the trimmer may be too heavy to easily move over the required area. Furthermore, unless one is very careful, the grass may cut unevenly because of the difficulty of maintaining accurately the height of the trimmer above the ground. Accordingly, various devices have been proposed for supporting a trimmer. U.S. Pat. No. 4,007,191 (Pittinger, Sr. et al) shows a device for supporting a filament trimmer on a wheeled base. The base is generally flat, and the wheels are adjustable with respect to the base in various directions. U.S. Pat. No. 4,182,100 (Letter) shows a carriage for receiving a filament-type trimmer. The carriage comprises a three-wheeled vehicle with two upstanding posts, each post having a device for engaging the cylindrical handle of the trimmer. U.S. Pat. No. 4,389,836 (Lowry, et al) shows a device for supporting a grass trimmer. A flange member is attached to the trimming device and is adapted to be removably attached to the carriage so that the trimmer may be used for either mowing or trimming. U.S. Pat. No. 4,411,126 (Lowry et al) also shows a carriage for receiving a filament-type trimmer. The trimmer is mounted to a platform which is in turn adjustably mounted to a frame.

SUMMARY OF INVENTION

The devices shown in the prior art for supporting a trimmer are both complex and cumbersome. These devices either require an adapter plate or other arrangement for securing the trimmer to the carriage making attachment of the trimmer to the carriage somewhat difficult. Furthermore, the carriages shown in the prior patents consume as much storage space as that of a regular lawn mower and are thus difficult to use.

In accordance with the invention, a lightweight, easily used, and easily stored apparatus is provided. In the preferred embodiment, a lawn trimmer is engaged only at its handle in an extremely simple and easily-implemented manner. When not in use, the device may be easily disassembled for storage in a limited space.

The apparatus of the invention includes two spaced frame members each of which has wheels. A yoke member extends between the frame members and preferably includes a cylindrical opening for engaging the cylindrical handle of the trimmer. The yoke is comprised of two parts which are separable at the cylindrical opening. Installation is accomplished by simply pivoting the two yoke portions, inserting the handle into a semi-cylindrical recess, and pivoting the portions to close the cylindrical opening to tightly grasp the handle. The yoke is adjustable in orientation about a horizontal axis and its position with respect to the frame members. Thus, accurate positioning of the trimming device is easily accomplished.

When storing the device, the yoke may be completely separated into two parts which are easily stored by placing them adjacent each other to reduce the required storage space.

It is an object of this invention to provide an economical carriage for a trimming device.

Another object of this invention is to provide a carriage for a trimming device which may be easily disassembled for storage.

Yet another object of this invention is to provide an economical carriage for a trimmer which may be made entirely of plastic and which is easily used and disassembled.

BRIEF DESCRIPTION OF THE DRAWINGS

FIG. 3 is a top view of the apparatus in a partially disassembled form.

FIG. 4 is a front view of the yoke of the apparatus shown in FIG. 1.

FIG. 5 is a rear view of the yoke of the apparatus shown in FIG. 1.

DETAILED DESCRIPTION OF THE DRAWINGS

Figure 1:
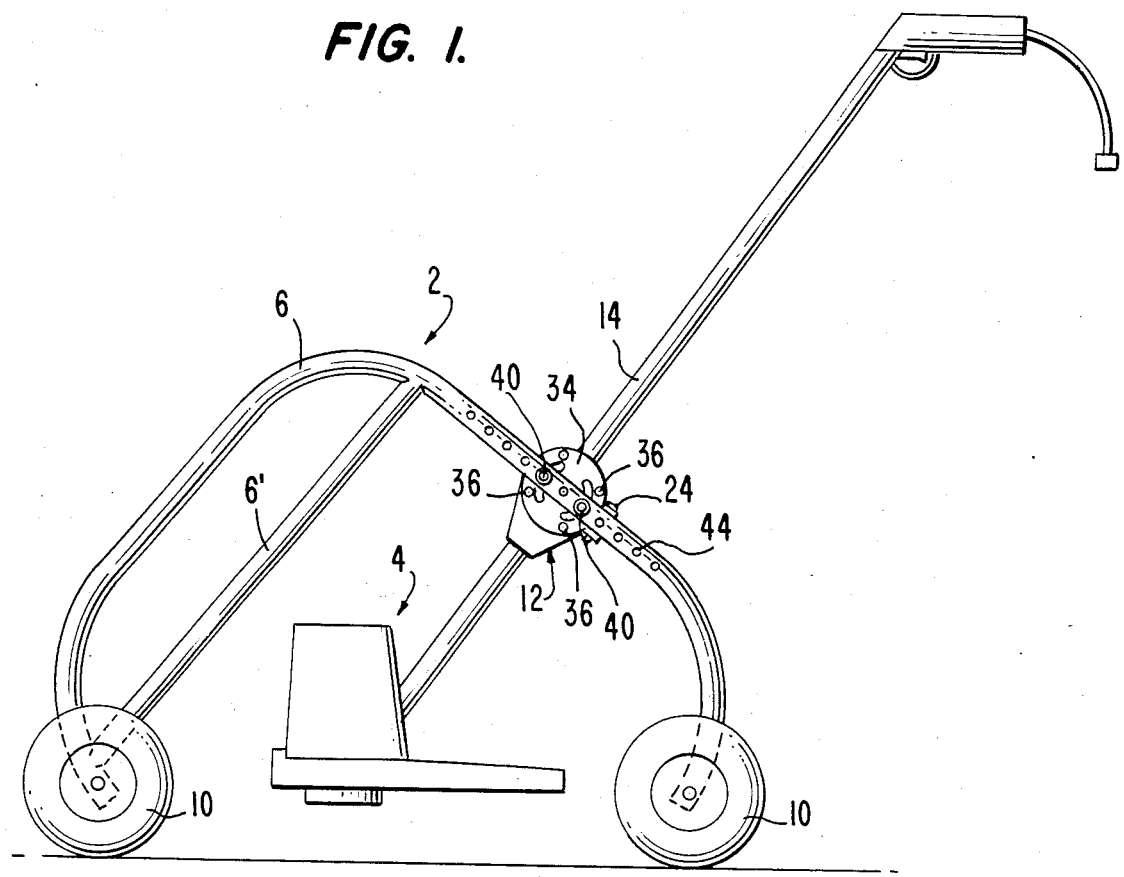
FIG. 1 is a side view of an apparatus in accordance with the invention.
Figure 2:
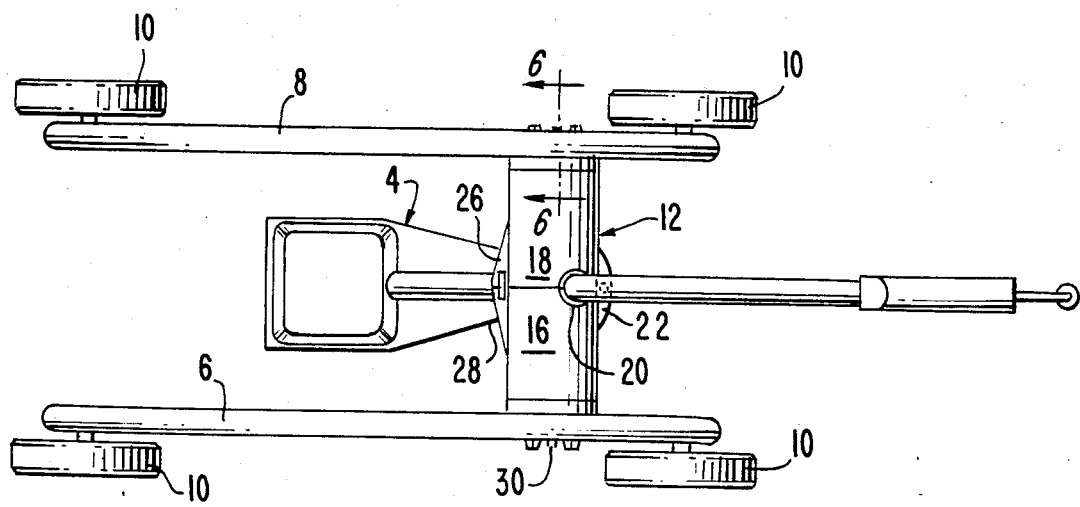
FIG. 2 is a top view of the apparatus.

With reference to FIGS. 1 and 2 a carriage 2 according to the invention is shown supporting a known filament-type trimmer 4.

Carriage 2 includes spaced frame members 6, 8, and each frame member preferably includes two wheels 10. The frame members are connected by a yoke 12, which is designed to engage a handle 14 of trimmer 4.

Yoke 12 preferably comprises two portions 16, 18, and a cylindrical opening 20 extends through yoke 12 to engage cylindrical handle 14.

FIG. 3 is a top-view similar to that of FIG. 2 but showing the inventive carriage 2 in an "open" position. It will be seen that opening 20 is formed by two semi-circular depressions 20' and 20", each of which is located along a respective edge of yoke portions 16 and 18. The yoke portions are connected at one side by hinge members 22 and hinge pin 24. The opposed side of yoke 12 includes clasp members 26 and 28 which secure the yoke portions 16, 18 together when in the "closed" position shown in FIGS. 1 and 2.

FIG. 4 is a front-view of the yoke 12 showing the clasp members 26, 28 in more detail. The clasp may be one such as that used to secure a lid of a box. Pins 30 extend outwardly from yoke 12 to engage respective frame members in a manner to be described below with respect to FIGS. 6 and 7.

FIG. 5 is a rear-view of yoke 12 showing hinge members 22 and hinge pin 24. In the preferred embodiment, hinge pin 24 is easily removed for purposes of storage. It will be appreciated that yoke 12 may be completely separated into two parts by opening clasp members 26 and 28 and removing hinge pin 24. The two parts of carriage 2 can be easily stored in substantially one-half the space occupied by the assembled carriage. This results in extremely convenient apparatus useful for persons having limited storage space.

FIG. 5 shows a chain 32 connecting portions 16 with hinge pin 24 to assist in removal and prevent misplacement of hinge pin 24.

Figure 6:
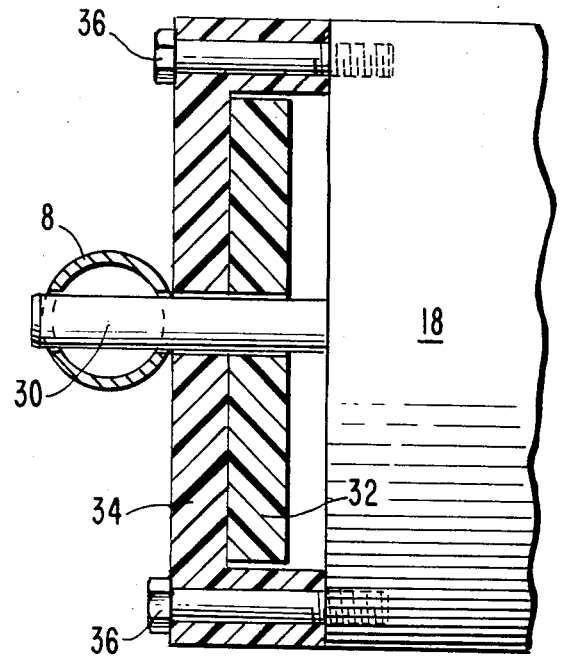
FIG. 6 is a partial cross section taken along line 6—6 of FIG. 2.
Figure 7:
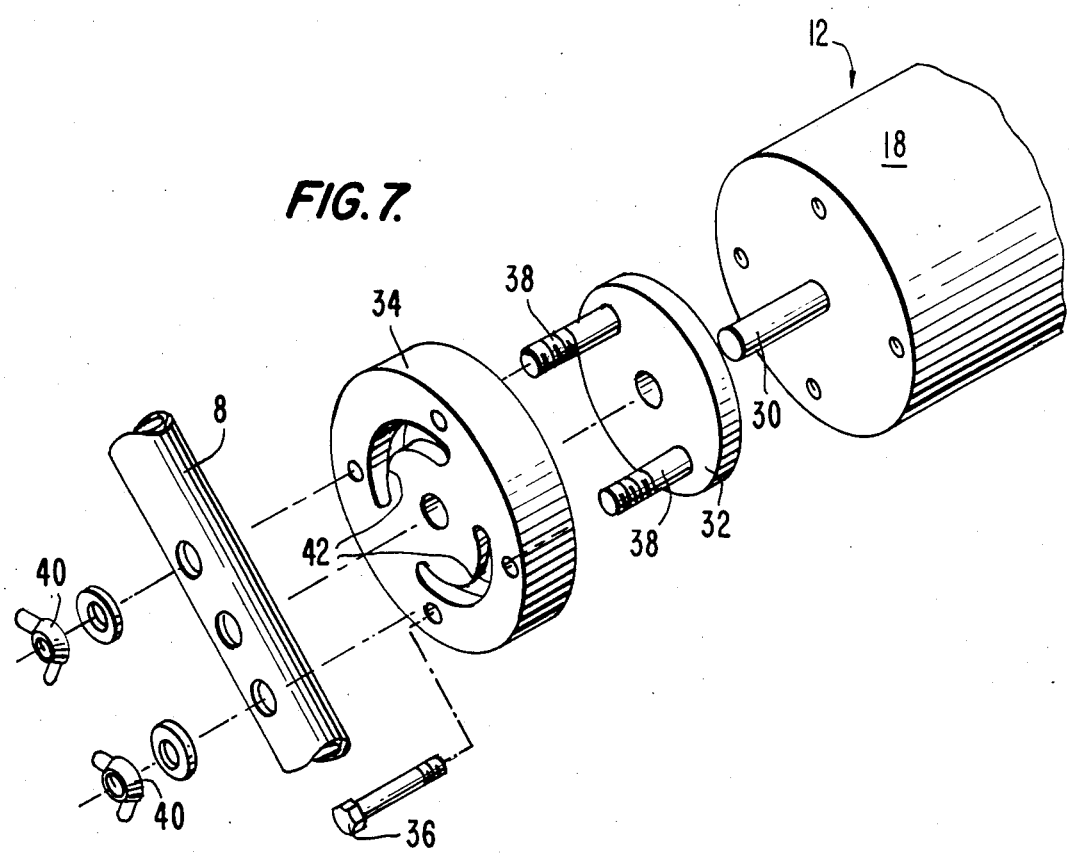
FIG. 7 is an exploded view of the attachment between the yoke and the frame.

FIG. 6 is a partial cross-section taken along line 6—6 of FIG. 2, and FIG. 7 is an exploded view of the connection between the yoke 12 and a frame member. Pin 30 is fixed to yoke portion 18 and extends through a clamping plate 32, a clutch plate 34 and frame member 8. Clutch plate 34 is secured to yoke portion 18 by bolts 36, and clamping plate 32 is secured to frame member 8 by bolts 38 and nuts 40. Clutch plate 34 includes slots 42 for allowing passage of bolts 38 therethrough and for limiting the angular extent by which yoke 12 can rotate with respect to frame member 8.

It will be appreciated that pins 30 establish a horizontal axis about which yoke 12 and trimmer 4 can rotate. Rotation is achieved by loosening nuts 40 to allow clutch plate 34 and yoke 12 to rotate with resepct to clamping plate 32 and frame member 8. When the desired orientation is achieved, nuts 40 are tightened to secure yoke 12 in the chosen orientation.

As shown in FIG. 1, frame members 6 and 8 have a plurality of holes 44 for receiving bolts and pins 30 to allow adjustment of the location of the yoke with respect to the frame members. In the preferred embodiment, a pin 30 is located halfway between bolts 38 so that any set of three holes 44 may be used. FIG. 1 also shows a brace 6' to provide added strength to the frame members, particularly when they are made of plastic.

It will be appreciated that a simple, easily-used and easily-stored apparatus has been described. Modifications within the scope of the appended claims will be apparent to those with skill in the art.

We claim:

1. Apparatus for supporting a mowing device having an elongate handle comprising first frame means having at least two wheels mounted thereon for rotation about first parallel axes, second frame means having at least two wheels mounted thereon for rotation about second parallel axes, first yoke means fixed to said first frame means at one end thereof and having means forming a first portion of a receptacle for receiving said handle at an opposite end thereof, second yoke means fixed to said second frame means at one end thereof and having means forming a second portion of said receptacle at an opposite end thereof, and means for removably securing said first and second yoke means together to form a complete receptacle and for placing said first parallel axes parallel to said second parallel axes.

2. Apparatus for supporting a mowing device of the type having at least one elongate handle, said apparatus comprising engaging means for engaging said elongate handle and supporting said device, and wheel means for supporting said engaging means, said engaging means comprising separable parts joined at adjacent ends, each of said adjacent ends comprising means for receiving said elongate handle wherein said separable parts are pivotally attached to permit said adjacent ends to be separated to receive or release said elongate handle, said engaging means being angularly adjustable with respect to said wheel means, said wheel means comprising a pair of spaced frame members and wheels attached to each of said frame members, and said engaging means comprising pin means extending into each of said frame members for providing an angularly adjustable connection between said frame members and said engaging means, and further comprising clutch means for selectively securing said engaging means to said frame members to prevent a change in angular orientation, wherein said clutch means comprises a clutch plate attached to said engaging means, and a clamping plate for clamping said clutch plate to said frame member.

3. Apparatus according to claim 2 wherein said clutch plate includes a slot and said clamping plate includes a bolt which extends through said slot and wherein said slot extends in a circumferential direction with respect to said pin means.

4. Apparatus according to claim 2 wherein each said means for receiving comprises a semi-cylindrical recess in each of said adjacent ends.

5. Apparatus according to claim 4 wherein said separable parts are pivotally attached by a removable pin.

6. Apparatus according to claim 5 wherein said frame members have a plurality of holes, each of said holes being for selectively receiving said pin means.

* * * * *